(12) United States Patent
Komaju

(10) Patent No.: US 7,518,690 B2
(45) Date of Patent: Apr. 14, 2009

(54) IMAGE DISPLAY DEVICE

(75) Inventor: Manabu Komaju, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 90 days.

(21) Appl. No.: 11/802,784

(22) Filed: May 24, 2007

(65) Prior Publication Data
US 2008/0030668 A1 Feb. 7, 2008

(30) Foreign Application Priority Data
May 25, 2006 (JP) ............... 2006-144763

(51) Int. Cl.
G02F 1/1345 (2006.01)
G01R 31/00 (2006.01)

(52) U.S. Cl. .................. 349/151; 349/149; 349/152; 349/192; 324/770

(58) Field of Classification Search .......... 349/54, 349/149, 151, 152, 192; 324/770; 359/245
See application file for complete search history.

(56) References Cited

U.S. PATENT DOCUMENTS 6,930,744 B1 * 8/2005 Ukita ............... 349/152

FOREIGN PATENT DOCUMENTS

JP 2005-121976 5/2005

* cited by examiner

Primary Examiner—Brian Healy
Assistant Examiner—Michael P Mooney
(74) Attorney, Agent, or Firm—McGinn IP Law Group, PLLC

(57) ABSTRACT

An image display device prevents display abnormality due to the corrosion and/or disappearance of the testing electrodes and/or and the conductive film for leading lines with a simple structure. Leading lines, which are in the wiring terminal section, electrically connect internal wiring lines to a driver IC. Each of the leading line has a mounting electrode and a testing electrode. A patterned first conductive film, which is separate from the testing electrode, connects electrically the mounting electrode to the corresponding internal wiring line in the display section. A patterned connecting conductive film is formed on an insulative film to contact with the mounting and testing electrodes, thereby making electrical interconnection between the mounting and testing electrodes. The connecting conductive film is made of a material (e.g., ITO) whose corrosion resistance is greater than a material (e.g., Cr) for the testing electrode.

7 Claims, 7 Drawing Sheets

COG TYPE LCD DEVICE
10

DISPLAY SECTION

11

WIRING TERMINAL SECTION

12

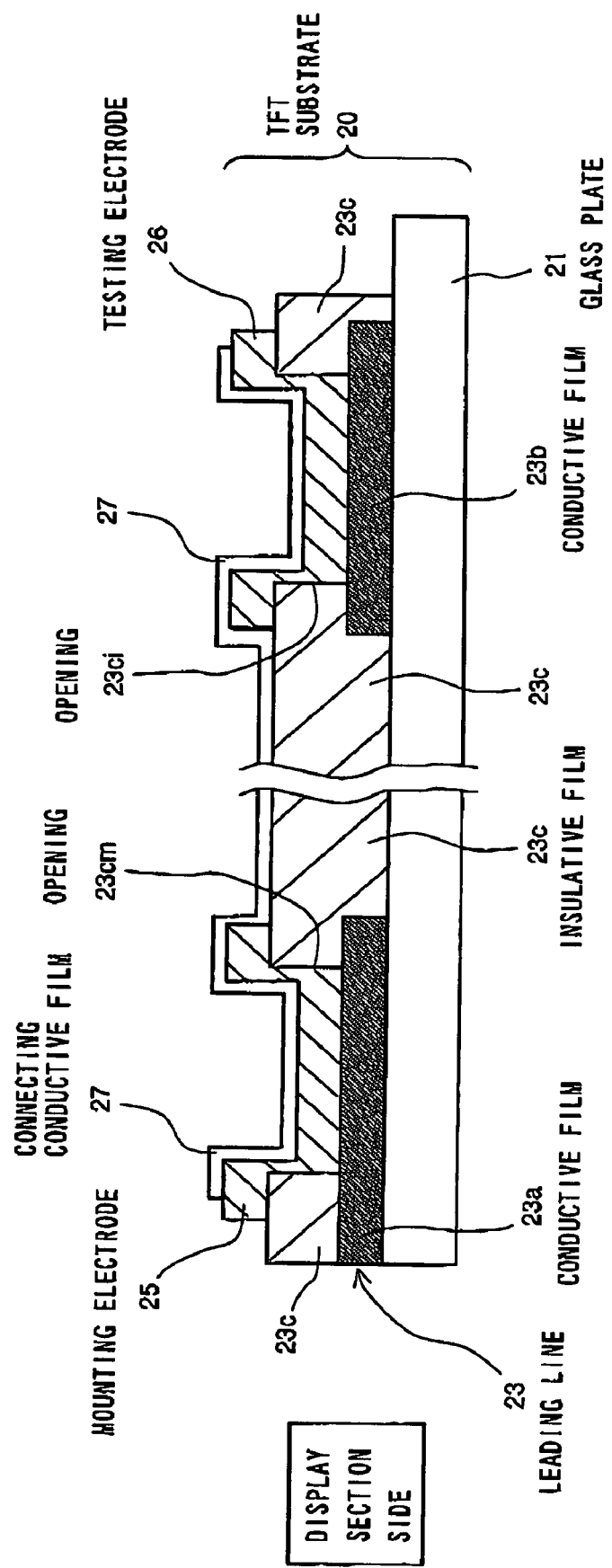

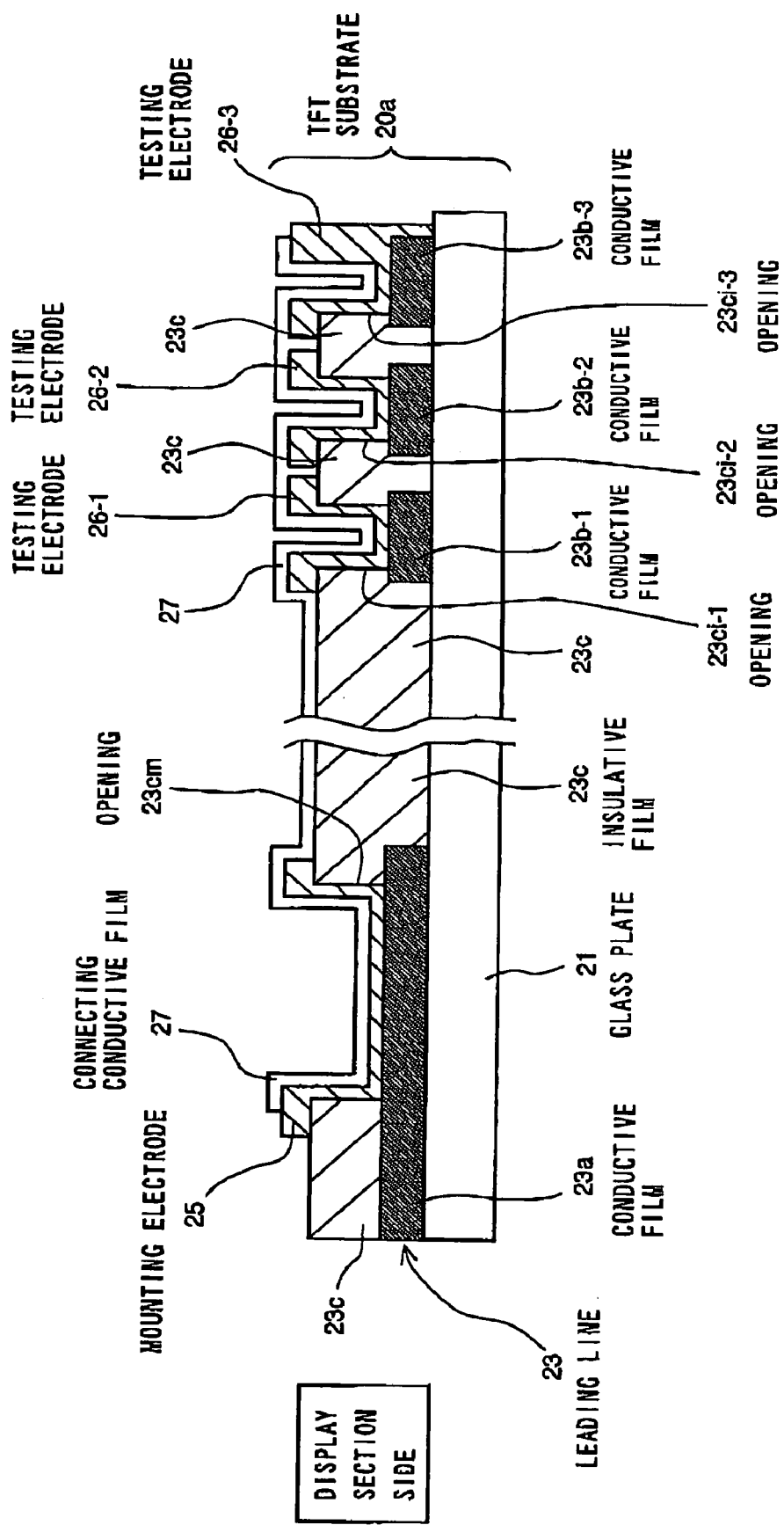

IMAGE DISPLAY DEVICE

BACKGROUND OF THE INVENTION

1. Field of the Invention

The present invention relates to an image display device such as a liquid-crystal display (LCD) device and a plasma display device. More particularly, the invention relates to an image display device having a display section including pixels arranged in a matrix array, and a wiring terminal section where a driver IC (Integrated Circuit) or driving semiconductor device is mounted. Mounting electrodes for mounting the driver IC and testing electrodes for testing the display section for defects are formed in the wiring terminal section.

2. Description of the Related Art

In recent years, the LCD device has been extensively used as a high-resolution display or image display device. In general, the LCD device comprises a substrate (which will be referred to as the TFT substrate) on which switching elements such as thin-film transistors (TFTS) are formed, another substrate (which will be referred to as the CF substrate) on which a color filter, a black matrix and so on are formed, and a liquid crystal layer disposed between the TFT substrate and the CF substrate. The alignment of the liquid crystal molecules is changed by the electric field applied across the electrodes formed on the TPT substrate and that formed on the CF substrate, or across the electrodes formed on the TFT, thereby controlling the amount of transmitted light in each pixel to display images.

The section or region of the LCD device used for displaying images, which is termed the "display section", comprises a plurality of pixels arranged in a matrix array. In the display section, usually, various wiring lines, such as gate electrode lines (or scanning lines), drain electrode lines (or signal lines), common electrode lines, and so on are formed on the TFT substrate.

The LCD device comprises the "wiring terminal section" formed outside the display section, which is a section or region for connecting a driver IC (i.e., a driving semiconductor device) for driving the liquid crystal. In the wiring terminal section, leading lines are formed to electrically connect the driver IC to the wiring lines provided in the display section. The wiring lines formed in the display section will be termed the "internal wiring lines" below. It is typical that the driver IC configured to form a tape carrier package (TCP) is electrically connected to the ends of the leading lines by the tape automated bonding (TAB) method.

By the way, in recent years, the chip on glass (COG) type LCD device, where the driver IC for driving the liquid crystal is directly mounted on the TFT substrate, has been developed and become commercially practical. The COG type LCD device has an advantage that reduction of the thickness and weight can be achieved compared with the conventional LCD device where the driver IC is mounted on the TFT substrate by the TAB method. With the COG type LCD device, a plurality of mounting electrodes or pads, which are used for electrical connection between the leading lines and the driver IC, are formed at midpoints of the respective leading lines. Moreover, a plurality of testing electrodes, which are used for testing the display section for defects, are formed to be adjacent to the corresponding mounting electrodes. The testing electrodes are electrically connected to the corresponding mounting electrodes, in other words, the testing electrodes are formed at one-to-one correspondence to the mounting electrodes.

FIG. 2 is a partial plan view showing the schematic structure of the wiring terminal section of a prior-art COG type LCD device. FIG. 1 is a partial cross-sectional view along the line I-I in FIG. 2.

As shown in FIG. 2, the prior-art COG type LCD device comprises a display section 111 and a wiring terminal section 112. The display section 111 is a section or region for displaying images and includes a plurality of pixels arranged in a matrix array. The wiring terminal section 112, which is provided outside the display section 111, is a section or region on which a driver IC that drives the liquid crystal is mounted and to which a flexible printed circuit (FPC) is connected.

In the wiring terminal section 112, a plurality of leading lines 123 are formed to lead the wiring lines in the display section 111 (i.e., the internal wiring lines) out to the wiring terminal section 112 and to electrically connect the internal wiring lines to the driver IC and the FPC (both not shown). As shown in FIG. 2, these leading lines 123 are extended to the vicinity of the opposite end of the TFT substrate 120 to the display section 111 by way of a mounting region 124 formed in the wiring terminal section 112 on the TFT substrate 120. The mounting region 124 is provided for mounting the driver IC.

In FIG. 2, only 13 of the leading lines 123 are shown. Testing electrodes or pads 126, which are used for testing the display section 111 for defects, are provided at the ends of the respective leading lines 123. Mounting electrodes or pads 125, which are used for mounting the driver IC, are provided on the respective leading lines 123 to be adjacent to the corresponding testing electrodes 126. The mounting electrode 125 and the testing electrode 126 provided on the same leading line 123 are electrically connected to each other by way of the part of the line 123 between these two electrodes 125 and 126.

In FIG. 2, the mounting electrode 125 and the testing electrode 126 provided on the leading line 123 and those provided on its adjacent one are shifted at a predetermined distance along their extension direction (i.e., the vertical direction in FIG. 2), resulting in a zigzag pattern as a whole. The structures of the leading lines 123 and their corresponding mounting and testing electrodes 125 and 126 are the same.

The mounting electrodes 125, all of which are placed in the mounting region 124 for the driver IC, are used to electrically connect the lead lines 123 to the corresponding bumps (not shown) of the driver IC with an asymmetric conductive film (ACF). The testing electrodes 126, all of which are placed outside the mounting region 124, are used to test the display section 111 for defects.

The structure of the leading line 123 is shown in FIG. 1. The line 123 is made of a narrow-belt-shaped conductive film 123a formed on a glass plate 121 of the TFT substrate 120, and a narrow-belt-shaped insulative film 123c formed on the glass plate 121 to cover the conductive film 123a. One end of the conductive film 123a is electrically connected to the corresponding internal wiring line (not shown) in the display section 111 and the other end thereof is extended to the testing electrode 126. Thus, the mounting electrode 125 and the testing electrode 126 are electrically interconnected by way of the conductive film 123a. The conductive film 123a is made of, for example, chromium (Cr) having a low resistivity.

The insulative film 123c, which covers entirely the conductive film 123a, is selectively removed at two positions to form two openings 123cm and 123ci. The mounting electrode 125 is formed to fit into the opening 123cm located on the side of the display section 111. The testing electrode 126 is formed to fit into the opening 123ci located on the opposite side to the display section 111 (i.e., the side of the end of the wiring terminal section 112). Each of the mounting and testing electrodes 125 and 126 is formed to have a plate-like shape whose central position is depressed, where its peripheral part is placed on the insulative film 123c and the remaining part thereof is placed in the opening 123cm or 123ci The electrodes 125 and 126 are in contact with the conductive film 123a by way of the openings 123cm and 123ci, respectively. The electrodes 125 and 126 are made of the same material (e.g., Cr) as the conductive film 123a.

Cap conductor films 127 and 128 are formed on the mounting and testing electrodes 125 and 126 to cover their almost entire surfaces, respectively. The cap conductor films 127 and 128 are made of, for example, indium tin oxide (ITO) as a transparent conductive material.

As another prior art relating to the present invention, the Japanese Non-Examined Patent Publication No. 2005-121976 discloses an image display device, which comprises the following structure. Specifically, this device comprises internal wiring lines (i.e., wiring lines formed in the display section) and leading lines (i.e., wiring lines formed in the peripheral section), the leading lines being connected in common to one of the internal wiring lines. Some of the leading lines are formed by first conductive lines made of a material (e.g., ITO) having a relatively high corrosion resistance and a relatively high resistivity. The remaining leading lines are formed by second conductive lines made of a material (e.g., a metal) having a relatively low corrosion resistance and a relatively low resistivity.

With this prior-art image display device, when no corrosion occurs in the leading lines, the internal wiring line can be electrically connected to the driver IC (the driving circuit) by way of the leading lines (i.e., the first and second conductive lines) having a relatively low composite resistance. On the other hand, even when corrosion advances in the leading lines, the situation that all the first and second conductive lines (i.e., all the leading lines) are broken down can be prevented. As a result, at least in the initial stage, high display quality is obtainable. Moreover, even after this device is used for a long time, all the leading lines (i.e., the first and second conductive lines) are prevented from being broken down and therefore, the display quality of this device can be kept at a certain level or higher (see FIGS. 5 and 6, paragraphs 0011 to 0012, 0018, and 0026 to 0028).

With the prior-art COG type LCD device shown in FIGS. 1 and 2, the test for detecting a defect in the display section 111 is carried out before mounting the driver IC. During this test, first, the probes of a predetermined testing or inspecting apparatus are contacted with the testing electrodes 126. Thereafter, a predetermined driving voltage is applied to the respective pixels in the display section 111 by way of the testing electrodes 126, thereby testing whether each of the pixels is normally illuminated or not. At this time, due to the low corrosion resistance of Cr, the following problems will occur.

First, because of dirt attached to the testing electrodes 126, wear of the probes of the testing apparatus, attachment of foreign substances to the probes, and so on, minute electric discharge occurs at the contact areas between the testing electrodes 126 and the probes when the driving electrodes is applied. Thus, there is a possibility that change of color of the cap conductor film 128 happens, which leads to the disappearance of the testing electrode 126 made of Cr.

Second, if a cleaning solution is left in the wiring terminal section 112, Cr is turned to an oxide of Cr due to electrochemical reaction to dissolve into the cleaning solution when the driving electrode is applied to the testing electrodes 126 by way of the probes of the testing apparatus. As a result, there is a possibility that the testing electrode 126 made of Cr and the leading line 123 located adjacent thereto disappears.

Third, there is a possibility that the wiring resistance of the testing electrode 126 and the conductive film 123a located adjacent thereto rises due to the corrosion of the Cr films that constitute them.

These phenomena of the corrosion and disappearance of the testing electrode 126 and the Cr films (i.e., the testing electrode 126 and the conductive film 123a) in its vicinity will affect the mounting electrode 125 electrically connected to the testing electrode 126 by way of the conductive film 123a, thereby causing display abnormality.

In addition, with the prior-art image display device disclosed in the Publication No. 2005-121976, although corrosion of the metal wiring lines having a relatively low corrosion resistance is considered, any other thing is not disclosed. Nothing is referred to the testing electrodes 126 of the prior-art COG type LCD device shown in FIGS. 1 and 2. Moreover, of course, no mention is made of the above-described problems occurring in the test of the display section 111 and the countermeasures against these problems.

SUMMARY OF THE INVENTION

The present invention was created through the consideration about the above-described problems.

An object of the present invention is to provide an image display device that makes it possible to prevent effectively the occurrence of display abnormality due to the corrosion and/or disappearance of the testing electrodes and the conductive films for the leading lines when testing the display section for defects with a simple structure.

Another object of the present invention is to provide an image display device that can be fabricated easily without changing the materials for the testing electrodes and the conductive films for the leading lines nor adding any new process.

The above objects together with others not specifically mentioned will become clear to those skilled in the art from the following description.

An image display device according to the present invention comprises:

a display section including pixels arranged in a matrix array and internal wiring lines;

a wiring terminal section including a mounting region in which a driving semiconductor device is mounted;

leading lines, which are formed in the wiring terminal section, for electrical interconnection between the internal wiring lines and the driving semiconductor device;

each of the leading lines having a mounting electrode for mounting the driving semiconductor device and a testing electrode for testing the display section for a defect;

a patterned first conductive film forming each of the leading lines, which is formed separate from the testing electrode, for electrically connecting the mounting electrode to a corresponding one of the internal wiring lines;

an insulative film formed to cover the first conductive film;

a patterned connecting conductive film formed on the insulative film to be in contact with the mounting electrode and the testing electrode, thereby electrically connecting the mounting electrode to the testing electrode; and the connecting conductive film being made of a material whose corrosion resistance in testing the display section for a defect is greater than that of a material for the testing electrode.

With the image display device according to the invention, as explained above, the patterned first conductive film for electrically connecting the mounting electrode to the corresponding one of the internal wiring lines is formed separate from the testing electrode. This means that the first conductive film is electrically connected to only the mounting electrode and is not electrically connected to the testing electrode. Therefore, in testing the display section for a defect, the possibility that the first conductive film corrodes and/or disappears in the vicinity of the testing electrode is restrained.

Moreover, electrical connection between the mounting electrode and the testing electrode is realized with the connecting conductive film formed on the insulative film that covers the first conductive film. In addition, the connecting conductive film is made of a material (e.g., ITO) whose corrosion resistance in testing the display section for a defect is greater than that of the material for the testing electrode. Therefore, even if the testing electrode corrodes and/or disappears in the testing, the possibility that the corrosion and/or disappearance of the testing electrode is transmitted to the mounting electrode or the first conductive film by way of the connecting conductive film is very low.

Furthermore, since it is sufficient that the image display device according to the present invention has the above-described structure or features, the structure of the device is simplified.

Accordingly, the occurrence of display abnormality due to the corrosion and/or disappearance of the testing electrode and/or the first conductive film in the testing the display section for a defect can be prevented effectively with a simple structure.

Furthermore, with the image display device according to the present invention, the connecting conductive film is made of a material having a greater corrosion resistance in the testing of the display section than that of the material for the testing electrode. As such the corrosion-resistant material, ITO whose corrosion resistance in the testing is greater than Cr may be used. ITO is used as the material for the cap conductive films 127 and 128 formed respectively on the testing electrode 126 and the mounting electrode 125 of the prior-art LCD device explained previously. On the other hand, because it is sufficient that the first conductive film is formed separate from the testing electrode, Cr may be used for the first conductive film. Therefore, the above-described features of the present invention can be easily realized by changing the mask pattern for the first conductive film and the mask pattern for the cap conductive films 127 and 128.

Accordingly, the image display device according to the invention can be fabricated easily without changing the materials for the testing electrodes and the first conductive film nor adding any new process.

In a preferred embodiment of the device according to the invention, a patterned second conductive film forming each of the leading lines is additionally provided, which is formed in isolation right below the testing electrode and which is covered with the insulative film;

wherein the mounting electrode is in contact with the first conductive film by way of a first opening of the insulative film, and the testing electrode is in contact with the second conductive film by way of a second opening of the insulative film.

In this embodiment, since the patterned second conductive film is provided right below the testing electrode, there is a possibility that the second conductive film corrodes and/or disappears in testing the display section for a defect along with the testing electrode. However, the second conductive film is isolated and therefore, such the corrosion and/or disappearance as above does not affect the first conductive film.

On the other hand, the first conductive film is provided directly below the mounting electrode and the second conductive film is provided directly below the testing electrode. Thus, if the first and second conductive films are formed by patterning a single conductive film and then, the insulative film is formed to cover the first and second conductive films and is selectively etched to form the first and second openings, the depth of the second opening will be equal to that of the first opening. For this reason, when a conductive film is formed on the insulative film and is selectively etched to form the mounting electrode and the testing electrode, the formation conditions for the mounting and testing electrodes are the same. As a result, the formation conditions for the mounting and testing electrodes can be optimized easily.

On the contrary, when the second conductive film is not provided directly below the testing electrode, the depth of the second opening will be larger than that of the first opening. Therefore, when a conductive film is formed on the insulative film and is selectively etched to form the mounting and testing electrodes, it is difficult to form the mounting and testing electrodes to have desired shapes.

Accordingly, in this embodiment, there is an advantage that the image display device according to the invention can be fabricated more easily.

In another preferred embodiment of the device according to the invention, the first conductive film is made of Cr. In this embodiment, because Cr has a lower resistivity and a lower corrosion resistance (i.e., more likely to corrode) than ITO, Cr is more likely to corrode and/or disappear in the testing the display section than ITO. Therefore, the advantages of the present invention are obtainable conspicuously.

In still another preferred embodiment of the device according to the invention, the connecting conductive film is made of ITO. In this embodiment, since ITO has a comparatively high resistivity and a high corrosion resistance (i.e., less likely to corrode), ITO is appropriate to the material for the connecting conductive film. Moreover, by simply changing the mask pattern in the step of respectively forming the cap conductor films 127 and 128 on the surfaces of the mounting and testing electrodes 125 and 126 of the prior-art LCD device shown in FIGS. 1 and 2, an additional advantage that the structure or features of the invention can be easily realized is obtainable.

In a further preferred embodiment of the device according to the invention, an additional testing electrode is formed adjacent to the testing electrode, wherein the additional testing electrode is electrically connected to the mounting electrode and the testing electrode by way of the connecting conductive film. In this embodiment, since the count of the testing electrodes is two or more, even if one of the testing electrodes corrodes and/or disappears during the testing the display section, the remaining testing electrode may be used for the testing. Moreover, by contacting the probe to a different one of the testing electrodes according to the category or type of the testing, the possibility of the corrosion and/or disappearance of the respective testing electrodes can be reduced. The bad effect applied to the probe can be suppressed also. Accordingly, there is an advantage that the display abnormality can be prevented more effectively.

In this embodiment, it is preferred that a third conductive film is additionally provided, which is formed in isolation right below the additional testing electrode and which is covered with the insulative film, wherein the additional testing electrode is in contact with the third conductive film by way of a third opening of the insulative film.

In this embodiment, there is an advantage that the image display device according to the invention can be fabricated more easily.

In a still further preferred embodiment of the device according to the invention, the device is configured or constituted as a COG type liquid-crystal display device. In this embodiment, the advantages of the present invention are obtainable conspicuously.

BRIEF DESCRIPTION OF THE DRAWINGS

In order that the present invention may be readily carried into effect, it will now be described with reference to the accompanying drawings.

FIG. 6 is an enlarged partial cross-sectional view along the line VI-VI in FIG. 5, which shows the schematic structure of the leading lines formed in the wiring terminal section of the image display device (i.e., the COG type LCD device) according to the first embodiment of the invention.

FIG. 7 is an enlarged partial cross-sectional view similar to FIG. 6, which shows the schematic structure of the leading lines formed in the wiring terminal section of an image display device (i.e., the COG type LCD device) according to a second embodiment of the invention.

DETAILED DESCRIPTION OF THE PREFERRED EMBODIMENTS

Figure 1:
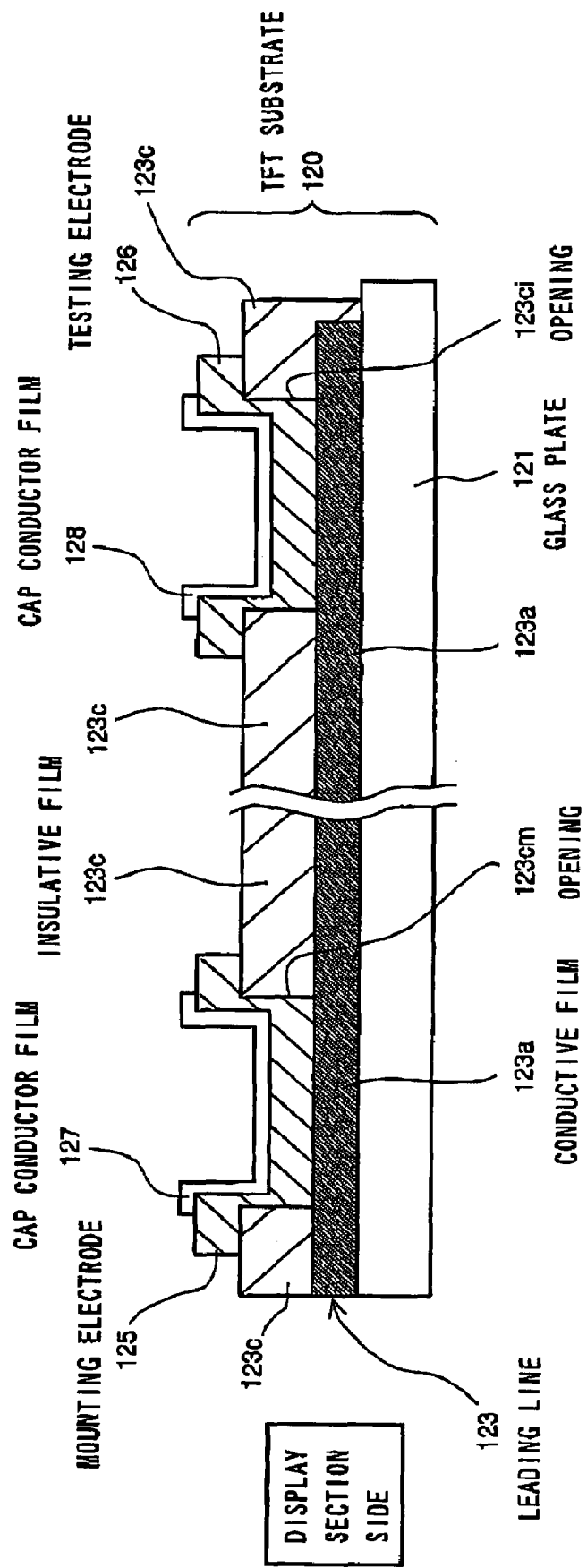
FIG. 1 is a partial cross-sectional view along the line I-I in FIG. 2.
Figure 2:
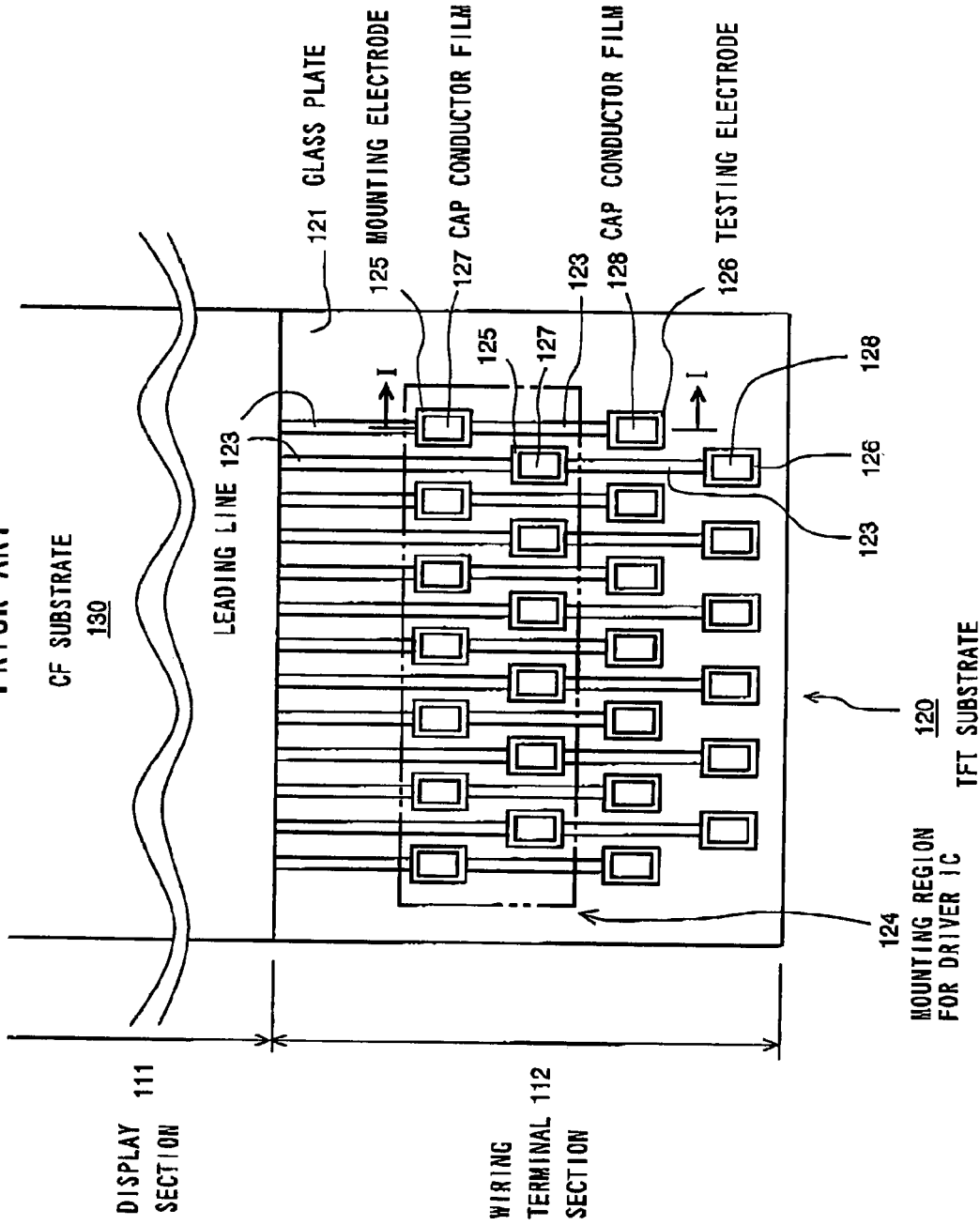
FIG. 2 is a partial plan view showing the schematic structure of the wiring terminal section of a prior-art COG type LCD device.

Preferred embodiments of the present invention will be described in detail below while referring to the drawings attached.

First Embodiment

An image display device according to a first embodiment of the present invention is shown in FIGS. 3 to 6, which is configured as a COG type LCD device 10.

Figure 3:
FIG. 3 is a conceptual diagram showing the whole structure of an image display device (i.e., a COG type LCD device) according to a first embodiment of the invention.

As shown in FIG. 3, the LCD device 10 according to the first embodiment comprises a display section 11 and a wiring terminal section 12 formed outside the display section 11 to be adjacent thereto. The display section 11 is a section or region for displaying images and includes a plurality of pixels arranged in a matrix array. The wiring terminal section 12 is a section or region in which a driver IC that drives the liquid crystal is mounted and a FPC is connected.

Figure 4:
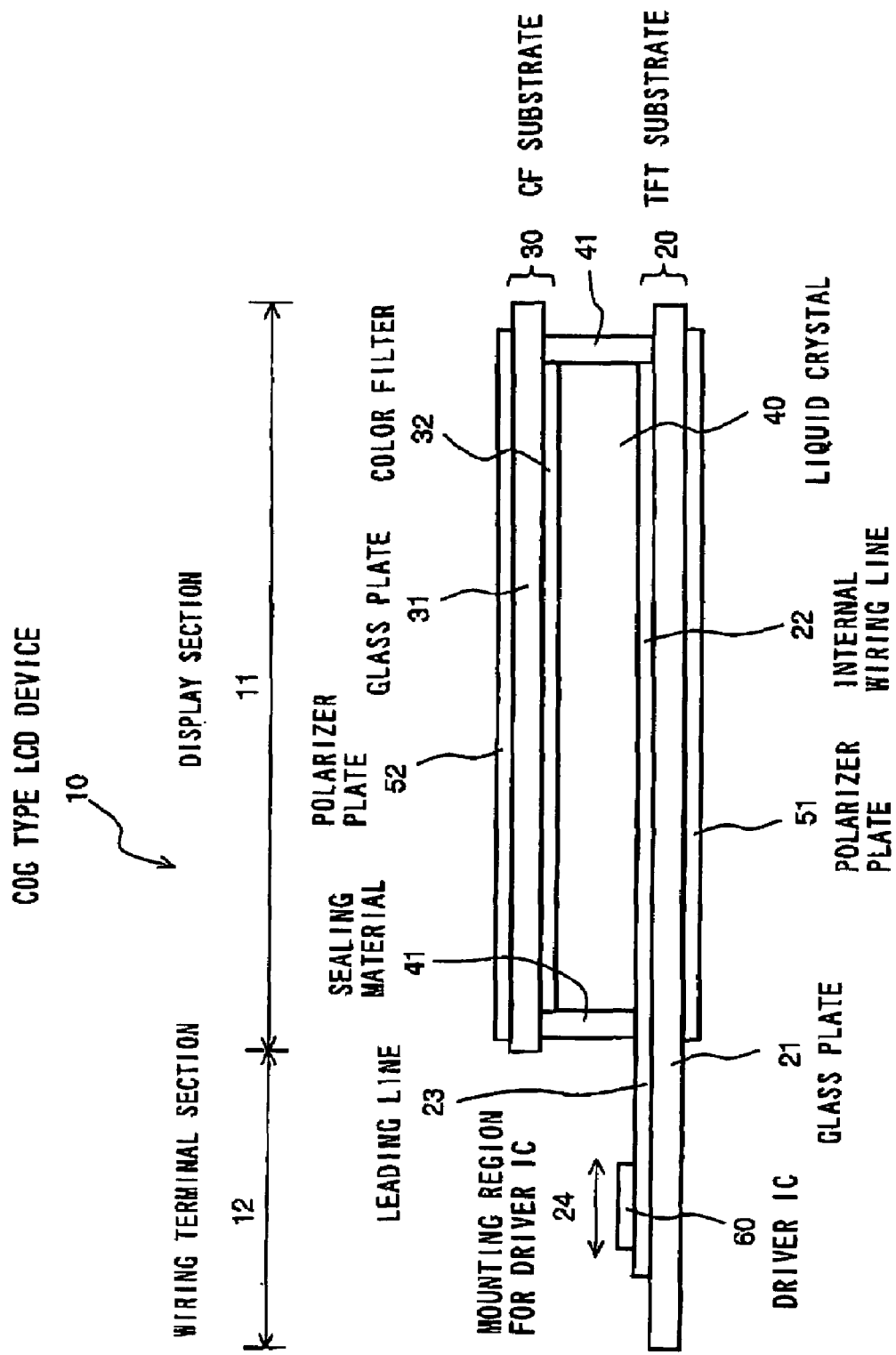
FIG. 4 is a side view showing the schematic structure of the image display device (i.e., the COG type LCD device) according to the first embodiment of the invention.

The schematic structures of the display section 11 and the wiring terminal section 12 are shown in FIG. 4. The display section 11 comprises a TFT substrate 20, a color filter (CF) substrate 30, and a liquid crystal 40 arranged between these two substrates 20 and 30. The TFT substrate 20 includes a glass plate 21, and TFTs and pixel electrodes (both not shown) arranged in a matrix array on the inner surface of the glass plate 21. The CF substrate 30 includes a glass plate 31, and a color filter (CF) 32, a black matrix, and so on formed on the inner surface of the glass plate 31. The liquid crystal 40 is confined in the space between the substrates 20 and 30 with a sealing material 41. The alignment of the liquid crystal molecules is changed by the electric field applied across the electrodes formed on the TFT substrate 20 and the electrode formed on the CF substrate 30, or across the electrodes formed on the TFT substrate 20, thereby controlling the amount of transmitted light in each pixel to display images. On the TFT substrate 20, various wiring lines, such as gate electrode lines (scanning lines), drain electrode lines (signal lines), common electrode lines (all of which are not shown) and so on are formed to have grid-like shapes, respectively. Polarizer plates 51 and 52 are attached onto the outer surfaces of the glass plates 21 and 31, respectively.

Figure 5:
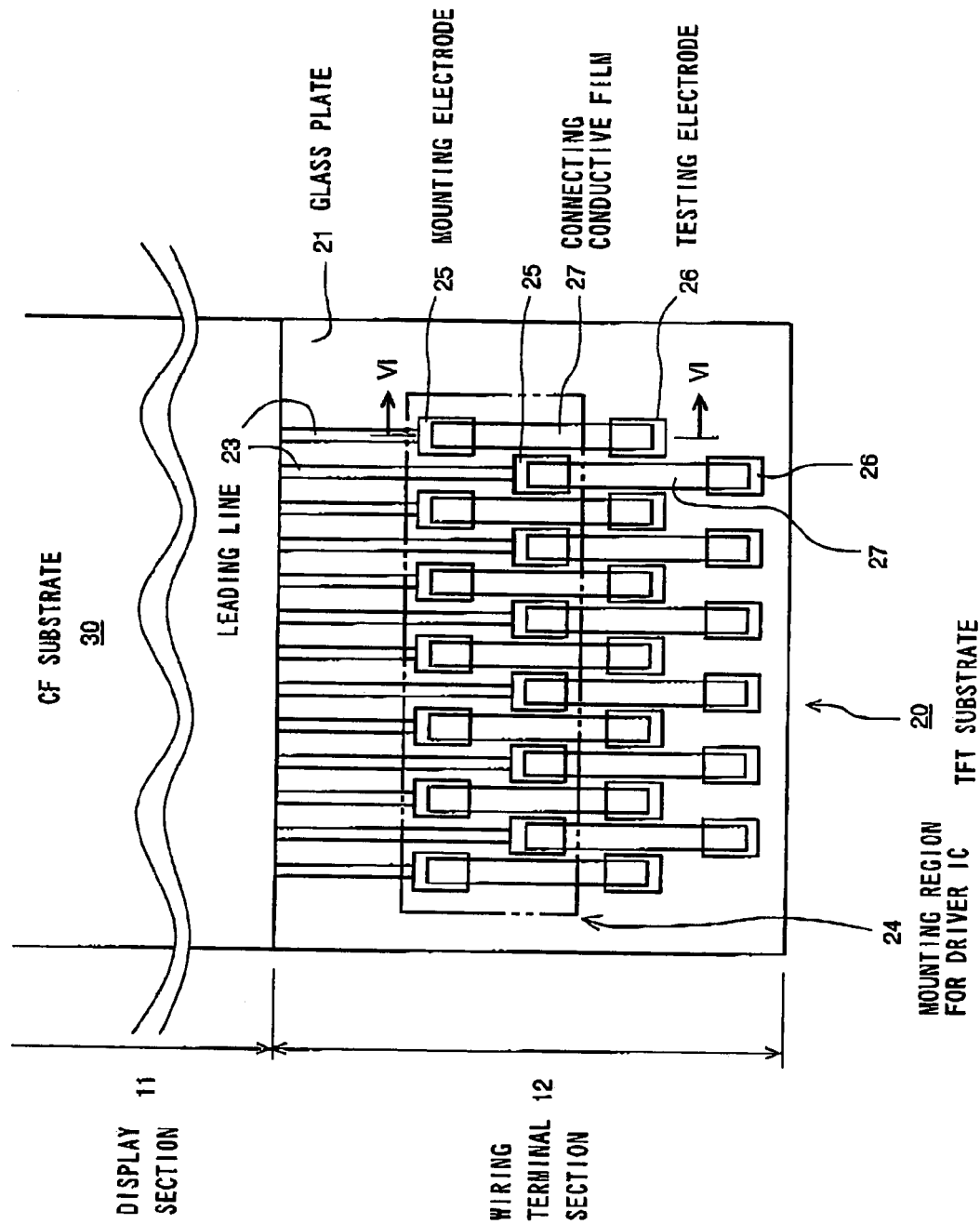
FIG. 5 is a partial plan view showing the schematic structure of the wiring terminal section of the image display device (i.e., the COG type LCD device) according to the first embodiment of the invention.

In FIG. 4, internal wiring lines 22 are shown on behalf of the various wiring lines provided in the display section 11. These internal wiring lines 22 are extended to the wiring terminal section 12 with the use of leading lines 23. As shown in FIG. 5, the leading lines 23 are extended to the vicinity of the opposite end of the TPT substrate 20 to the display section 11 by way of a mounting region 24 for mounting a driver IC 60, where the mounting region 24 is formed in the wiring terminal section 12 on the TFT substrate 20. For the sake of simplification, only 13 of the leading lines 23 are shown in FIG. 5.

With the LCD device 10, as shown in FIG. 5, a plurality of testing electrodes or pads 26, which are used for detecting the defects in the display section 11, are formed at the respective ends of the 13 leading lines 23. Moreover, a plurality of mounting electrodes or pads 25, which are used for mounting the driver IC 60, are formed to be adjacent to the corresponding testing electrodes 26. The mounting electrode 25 and the corresponding testing electrode 26 formed on the same lead line 23 are electrically connected to each other by way of a patterned connecting conductive film 27 having a narrow belt-like shape. The even-numbered leading lines 23 and the corresponding mounting and testing electrodes 25 and 26 formed thereon are shifted at a predetermined distance along the extension direction of the leading lines 23 (i.e., the vertical direction in FIG. 5) with respect to the odd-numbered leading lines 23 and the corresponding mounting and testing electrodes 25 and 26 formed thereon, resulting in a zigzag pattern as a whole.

All the mounting electrodes 25 are placed in the mounting region 24. The mounting electrodes 25 for seven of the leading lines 23 are aligned in the direction perpendicular to the lines 23 (i.e., the horizontal direction in FIG. 5) at one end of the mounting region 24 on the side of the display section 11. The mounting electrodes 25 for the remaining six leading lines 23 are aligned in the direction perpendicular to the lines 23 at the opposite end of the mounting region 24 to the display section 11. These mounting electrodes 25, the count of which is 13, are electrically connected to the corresponding bumps (not shown) of the driver IC 60 with an asymmetric conductive film (ACF), respectively.

All the testing electrodes 26 are placed outside the mounting region 24. The testing electrodes 26 for seven of the leading lines 23 are aligned near the mounting region 24 along its longitudinal direction (i.e., the horizontal direction in FIG. 5). The testing electrodes 26 for the remaining six leading lines 23 are aligned along the longitudinal direction of the region 24 at the positions slightly apart from the mounting region 24.

The structures of the 13 leading lines 23 and their corresponding mounting and testing electrodes 25 and 26 are the same. Therefore, the structure of the leading line 23 located at the right-side end of FIG. 5 and the structures of the mounting and testing electrodes 25 and 26 provided for the said line 23 will be explained below with reference to FIG. 6.

The leading line 23 shown in FIG. 6 is formed by a patterned conductive film 23a with a narrow belt-like shape, a patterned conductive film 23b with an island-like shape, and a patterned insulative film 23c with a narrow belt-like shape formed to cover the conductive films 23a and 23b. Each of the conductive films 23a and 23b is made of a patterned Cr film. The conductive films 23a and 23b and the insulative film 23c are placed on the glass plate 21 of the TFT substrate 20.

An end of the conductive film 23a is electrically connected to the corresponding one of the internal wiring lines 22 and the other end thereof is extended to the position right below the mounting electrode 25. The conductive film 23b is isolated at the position right below the testing electrode 26 and is separate from the conductive film 23a. Two openings 23cm and 23ci are formed to penetrate through the insulative film 23c in the regions superposed with the mounting electrode 25 and the testing electrode 26, respectively. The openings 23cm and 23ci have rectangular plan shapes. The conductive films 23a and 23b are exposed from the insulative film 23c through the openings 23cm and 23ci, respectively. The mounting electrode 25 is formed in such a way as to fit into the opening 23cm located on the side of the display section 11. The testing electrode 26 is formed in such a way as to fit into the opening 23ci located on the opposite side to the display section 11.

Each of the mounting and testing electrodes 25 and 26 is formed to have a plate-like shape whose central position is depressed, where its peripheral part is placed on the insulative film 23c and the remaining part thereof is placed in the opening 23cm or 23ci. Each of the electrodes 25 and 26 is made of Cr.

The bottom of the mounting electrode 25 is in contact with the conductive film 23a in the opening 23cm. The bottom of the testing electrode 26 is in contact with the conductive film 23b in the opening 23ci. Thus, the mounting electrode 25 is electrically connected to the conductive film 23a and the testing electrode 26 is electrically connected to the conductive film 23b.

The mounting electrode 25 is located right over the conductive film 23a. The testing electrode 26 is located right over the conductive film 23b. Therefore, none of the conductive films 23a and 23b is present in the intervening region between the mounting and testing electrodes 25 and 26.

Since the conductive films 23a and 23b are entirely covered with the insulative film 23c, the insulative film 23c is in contact with the glass plate 21 in the intervening region between the mounting and testing electrodes 25 and 26.

On the exposed surface of the insulative film 23c in the intervening region between the mounting and testing electrodes 25 and 26, a connecting conductive film 27 is formed for electrical interconnection between the electrodes 25 and 26. As shown in FIG. 5, the connecting conductive film 27 is patterned to have a narrow belt-like shape. One end of the connecting conductive film 27 is extended to the surface of the mounting electrode 25, covering almost all the surface of the said electrode 25. This is similar to the cap conductor film 127 formed on the mounting electrode 125 of the prior-art COG type LCD device (see FIG. 1). The other end of the connecting conductive film 27 is extended to the surface of the testing electrode 26, covering almost all the surface of the said electrode 26. This is similar to the cap conductor film 128 formed on the testing electrode 126 of the prior-art COG type (see FIG. 1). The connecting conductive film 27 is made of ITO whose corrosion resistance is higher (which is more difficult to corrode) than Cr. Thus, it may be said that the connecting conductive film 27 in the first embodiment of the invention corresponds to the one formed by interconnecting and unifying the cap conductive film 127 for the mounting electrode 125 and the cap conductive film 128 for the testing electrode 126 of the prior-art LCD device.

With the COG type LCD device 10 according to the first embodiment of the invention, as explained above, the conductive film 23a (which corresponds to the patterned first conductive film) for electrically connecting the mounting electrode 25 to the corresponding internal wiring line 22 is formed separate from the corresponding testing electrode 26. This means that the conductive film 23a is electrically connected to only the corresponding mounting electrode 25 and is not electrically connected to the corresponding testing electrode 26. Therefore, in the testing the display section 11 for defects by contacting the probes to the testing electrodes 26 of the respective leading lines 23, the possibility that the conductive films 23a corrodes or disappears in the vicinities of the respective testing electrodes 26 is restrained.

Moreover, electrical interconnection between the mounting electrode 25 and the testing electrode 26 for each of the lead lines 23 is realized with the connecting conductive film 27 formed on the insulative film 230 that covers the conductive film 23a. In addition, the connecting conductive film 27 is made of a material (i.e., ITO) whose corrosion resistance in the testing the display section 11 is higher than the material (i.e., Cr) of the testing electrode 26. Therefore, even if the testing electrode 26 corrodes or disappears in the testing, the possibility that the corrosion and/or disappearance of the testing electrode 26 is transmitted to the mounting electrode 25 or the conductive film 23a by way of the connecting conductive film 27 is very low.

Furthermore, since it is sufficient that the LCD device 10 according to the first embodiment has the above-described structure explained above with reference to FIGS. 5 and 6, the structure of the device 10 is simplified.

Accordingly, the occurrence of display abnormality due to the corrosion and/or disappearance of the testing electrodes 26 and/or the conductive film 23a for the leading lines 23 occurring in the testing the display section is prevented effectively with a simple structure.

Additionally, with the LCD device 10 according to the first embodiment, the connecting conductive film 27 is made of a material having a greater corrosion resistance in the testing the display section 11 than that of a material of the testing electrode 26. As such the corrosion-resistant material, ITO whose corrosion resistance in this testing is greater than Cr is used in the first embodiment. ITO is used as the material for the cap conductor films 127 and 128 formed respectively on the mounting and testing electrodes 125 and 126 of the prior-art LCD device explained previously.

On the other hand, because it is sufficient that the leading conductive film 23a is formed separate from the testing electrode 26, Cr may be used as the material for the leading conductive film 23a. Therefore, the above-described features of the first embodiment can be easily realized by simply changing the mask pattern for the leading conductive film 123a and the mask pattern for the cap conductor films 127 and 128.

Accordingly, the COG type LCD device 10 according to the first embodiment can be easily fabricated without changing the materials for the testing electrodes 26 and the conductive films 23a nor adding any new process.

In addition, with the device 10 according to the first embodiment, the conductive film 23b (which corresponds to the patterned second conductive film) is provided directly below the testing electrode 26. Thus, there is a possibility that the conductive film 23b corrodes and/or disappears along with the testing electrode 26 in testing the display section 11 for defects. However, the conductive film 23b is isolated and therefore, the effect of such the corrosion and/or disappearance is not applied to the conductive film 23a.

On the other hand, the conductive film 23a is provided directly below the mounting electrode 25 and the conductive film 23b is provided directly below the testing electrode 26. Therefore, if the conductive films 23a and 23b are formed by patterning a single conductive film and then, the insulative film 23c is formed on this conductive film and is selectively etched to form the opening 23cm (which corresponds to the first opening) and the opening 23ci (which corresponds to the second opening), the depth of the opening 23ci will be equal to that of the opening 23cm. For this reason, in the step where a conductive film is formed on the insulative film 23c and is selectively etched to form the mounting and testing electrodes 25 and 26, the formation conditions for the electrodes 25 and 26 are the same. As a result, the formation conditions for the electrodes 25 and 26 can be optimized easily.

On the contrary, when the conductive film 23b is not provided directly below the testing electrode 26, the depth of the opening 23ci will be greater than that of the opening 23cm. Therefore, when a conductive film is formed on the insulative film 23c and is selectively etched to form the mounting and testing electrodes 25 and 26, it is difficult to form the electrodes 25 and 26 to have desired shapes.

Accordingly, with the first embodiment, there is an advantage that the LCD device 10 can be fabricated more easily.

Since the connecting conductive film 27 is made of ITO having a higher corrosion resistance than Cr, it may be considered that there is no possibility that corrosion of the conductive film 27 is caused by the corrosion and/or disappearance of the Cr film during the testing. Therefore, even if the conductive film 27c is placed on the testing and mounting electrodes 26 and 25, there is no anxiety that the electrical interconnection between the electrodes 26 and 25 is eliminated during the testing.

Second Embodiment

FIG. 7 is an enlarged partial cross-sectional view similar to FIG. 6, which shows the schematic structure of the leading line 23 formed in the wiring terminal section 12 of a COG type LCD device as an image display device according to a second embodiment of the invention.

The leading line 23 in the second embodiment has the same structure as that of the leading line 23 in the above-described first embodiment except that three testing electrodes 26-1, 26-2, and 26-3 are provided instead of the testing electrode 26 for each of the mounting electrodes 25. It may be said that two additional testing electrodes 26-2 and 26-3 are added to the testing electrode 26-1 corresponding to the testing electrode 26 in the first embodiment. Therefore, the different portions from the first embodiment will be chiefly explained below.

As shown in FIG. 7, the leading line 23 comprises a patterned conductive film 23a with a narrow belt-like shape, three patterned conductive films 23b-1, 23b-2 and 23b-3 with island-like shapes, and a patterned insulative film 23c with a narrow belt-like shape formed to cover entirely these four conductive films 23a, 23b-1, 23b-2 and 23b-3. The conductive films 23b-1, 23b-2 and 23b-3 are aligned to be adjacent to each other along the extension direction of the leading line 23. The conductive films 23b-1 and 23b-2 are apart from each other at a predetermined interval. Similarly, the conductive films 23b-2 and 23b-3 are apart from each other at a predetermined interval also. These four conductive films 23a, 23b-1, 23b-2 and 23b-3 are placed on the glass plate 21 of a TFT substrate 20a.

Similar to the first embodiment, an end of the conductive film 23a is electrically connected to the corresponding internal wiring line 22, and the other end thereof is extended to the position right below the mounting electrode 25 and is apart from the testing electrodes 26-1, 26-2 and 26-3. The island-shaped conductive films 23b-1, 23b-2 and 23b-3 are located only in the regions right below the testing electrodes 26-1, 26-2, and 26-3, respectively. Therefore, none of the conductive film 23a and the conductive films 23b-1, 23b-2 and 23b-3 are not provided in the intervening region between the mounting electrode 25 and the testing electrode 26-1 located at the nearest position thereto, the intervening region between the testing electrodes 26-1 and 26-2, and the intervening region between the testing electrodes 26-2 and 26-3.

Since the conductive films 23a, 23b-1, 23b-2 and 23b-3 are entirely covered with the insulative film 23c except for the openings explained below, the insulative film 23c is in contact with the glass plate 21 in the intervening region between the mounting electrode 25 and the testing electrode 26-1, the intervening region between the testing electrodes 26-1 and 26-2, and the intervening region between the testing electrodes 26-2 and 26-3. Each of the conductive films 23a, 23b-1, 23b-2 and 23b-3 is made of Cr.

Similar to the first embodiment, an opening 23cm, having a rectangular plan shape is formed to penetrate through the insulative film 23c at the corresponding position to the mounting electrode 25. The conductive film 23a is exposed from the insulative film 23c through the opening 23cm. Moreover, three openings 23ci-1, 23ci-2 and 23ci-3 each having a rectangular plan shape are formed to penetrate through the insulative film 23c at the corresponding positions to the testing electrodes 26-1, 26-2 and 26-3, respectively. The conductive films 23b-1, 23b-2 and 23b-3 are exposed from the insulative film 23c through the openings 23ci-1, 23ci-2 and 23ci-3, respectively.

Similar to the first embodiment, the mounting electrode 25, which has a plate-like shape whose central position is depressed and which is made of Cr, is formed in the opening 23cm of the insulative film 23c. The bottom of the mounting electrode 25 is in contact with the conductive film 23a in the opening 23cm. The testing electrodes 26-1, 26-2 and 26-3 are formed in the openings 23ci-1, 23ci-2 and 23ci-3 of the insulative film 23c, respectively. Similar to the mounting electrode 25, each of the testing electrodes 26-1, 26-2 and 26-3 has a plate-like shape whose central position is depressed and is made of the same Cr as the conductive film 23a. The bottoms of the testing electrodes 26-1, 26-2 and 26-3 are in contact with the conductive films 23b-1, 23b-2 and 23b-3, respectively.

On the surface of the insulative film 23c exposed from the mounting electrode 25 and the testing electrodes 26-1, 26-2 and 26-3, a connecting conductive film 27 is formed. Similar to the first embodiment, an end of the conductive film 27 is extended to the surface of the mounting electrode 25 to cover the almost all the surface of the said electrode 25. The other end of the conductive film 27 is extended to the surface of the testing electrode 26-3 to cover almost all the surfaces of the testing electrodes 26-1, 26-2 and 26-3. The connecting conductive film 27 electrically connects the mounting electrode 25 to the testing electrodes 26-1, 26-2 and 26-3. The connecting conductive film 27 is made of ITO. Therefore, the connecting conductive film 27 corresponds to the combination of the cap conductor film 127 of the mounting electrode 125 and the cap conductor film 128 of the testing electrode 126 which are electrically connected to each other in the above-described prior-art LCD device.

As seen from FIGS. 6 and 7, each of the testing electrodes 26-1, 26-2 and 26-3 in the second embodiment is formed to be smaller than the testing electrode 26 in the first embodiment. This is because the space for the testing electrodes 26-1, 26-2 and 26-3 in the wiring terminal section 12 is limited. For this reason, the overall occupation space or area by the testing electrodes 26-1, 26-2 and 26-3 is restricted to one slightly wider than that of the testing electrode 26 in the first embodiment.

As explained above, the COG type LCD device according to the second embodiment of the invention corresponds to the one obtained by providing the three aligned testing electrodes 26-1, 26-2 and 26-3 instead of the single testing electrode 26 and by electrically connecting the testing electrodes 26-1, 26-2 and 26-3 to the mounting electrode 25 in the first embodiment. Therefore, it is apparent that the LCD device according to the second embodiment has the same advantages as those of the first embodiment described above.

Moreover, with the LCD device according to the second embodiment, the three testing electrodes 26-1, 26-2 and 26-3 are provided. Therefore, even if one of the testing electrodes 26-1, 26-2 and 26-3 corrodes and/or disappears during the testing the display section 11, the remaining testing electrodes can be used for the testing and at the same time, the progress of the corrosion and/or disappearance of the electrode 26-1, 26-2 or 26-3 toward the mounting electrode 25 can be prevented.

In addition, by contacting the probe with a different one of the testing electrodes 26-1, 26-2 and 26-3 according to the category or type of the testing, the possibility itself of the corrosion and/or disappearance of the testing electrodes 26-1, 26-2 and 26-3 can be reduced. The bad effect to the probe can be suppressed also.

Accordingly, with the LCD device according to the second embodiments the display abnormality can be prevented more effectively than the LCD device 10 according to the first embodiment.

OTHER EMBODIMENTS

The above-described first and second embodiments are concrete examples of the present invention. Therefore, needless to say, the present invention is not limited to these embodiments and any modification is applicable to them.

For example, although the image display device is configured as a COG type LCD device in the above-described first and second embodiments, the invention is not limited to the LCD device of this type. The invention is applicable to any other type of image display devices such as a plasma display device, if it comprises a display section including pixels arranged in a matrix array and a wiring terminal section including a mounting region for mounting a driving semiconductor device (a driver IC), wherein each of the leading lines has a mounting electrode for mounting the driving semiconductor device and a testing terminal for testing the display section for defects.

In addition, although the mounting and testing electrodes and the conductive films for the leading lines are made of Cr in the above-described first and second embodiments, any other metal having an equivalent possibility of corrosion and/or disappearance to Cr may be used instead of Cr. For examples tantalum (Ta), aluminum (Al), or the like may be used for this purpose.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. An image display device comprising:
   a display section including pixels arranged in a matrix array and internal wiring lines;
   a wiring terminal section including a mounting region in which a driving semiconductor device is mounted;
   leading lines, which are formed in the wiring terminal section, for electrical interconnection between the internal wiring lines and the driving semiconductor device;
   each of the leading lines having a mounting electrode for mounting the driving semiconductor device and a testing electrode for testing the display section for a defect;
   a patterned first conductive film forming each of the leading lines, which is formed separate from the testing electrode, for electrically connecting the mounting electrode to a corresponding one of the internal wiring lines;
   an insulative film formed to cover the first conductive film;
   a patterned connecting conductive film formed on the insulative film to be in contact with the mounting electrode and the testing electrode, thereby electrically connecting the mounting electrode to the testing electrode; and
   the connecting conductive film being made of a material whose corrosion resistance in testing the display section for a defect is greater than that of a material for the testing electrode.

2. The device according to claim 1, further comprising a patterned second conductive film forming each of the leading lines, which is formed in isolation right below the testing electrode and which is covered with the insulative film;
   wherein the mounting electrode is in contact with the first conductive film by way of a first opening of the insulative film, and
   the testing electrode is in contact with the second conductive film by way of a second opening of the insulative film.

3. The device according to claim 1, wherein the first conductive film is made of Cr.

4. The device according to claim 1, wherein the connecting conductive film is made of ITO.

5. The device according to claim 1, further comprising an additional testing electrode formed adjacent to the testing electrode:
   wherein the additional testing electrode is electrically connected to the mounting electrode and the testing electrode by way of the connecting conductive film.

6. The device according to claim 5, further comprising a third conductive film, which is formed in isolation right below the additional testing electrode and which is covered with the insulative film;
   wherein the additional testing electrode is in contact with the third conductive film by way of a third opening of the insulative film.

7. The device according to claim 1, wherein the device is configured or constituted as a COG type liquid-crystal display device.

* * * * *